July 16, 1935.　　F. E. DENNISON ET AL　　2,008,581
LUBRICATING SYSTEM
Filed Dec. 27, 1933
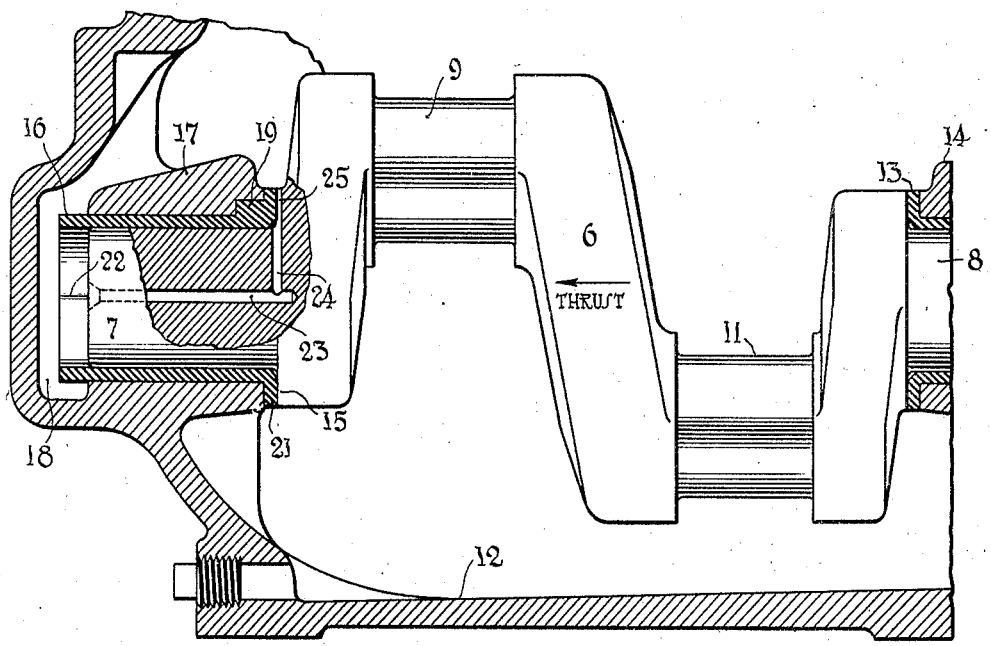
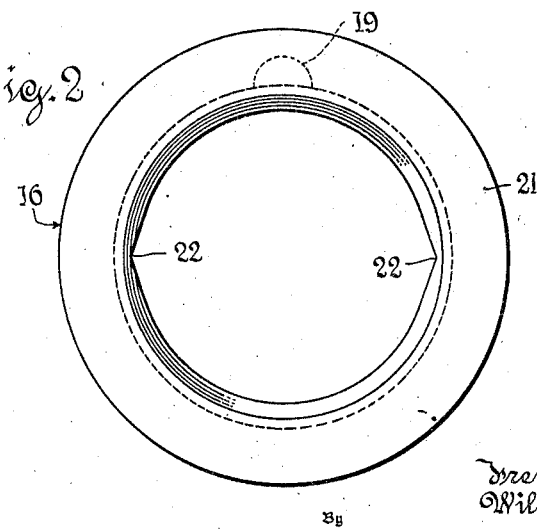
Inventor
French E. Dennison
William D. Leonard
Attorneys Patented July 16, 1935

2,008,581

UNITED STATES PATENT OFFICE 2,008,581

LUBRICATING SYSTEM

French E. Dennison and William D. Leonard, York, Pa., assignors to York Ice Machinery Corporation, York, Pa., a corporation of Delaware Application December 27, 1933, Serial No. 704,197

9 Claims. (Cl. 308—121)

This invention relates to the lubrication of bearings, particularly the lubrication of combined radial and thrust bearings.

The invention was developed for use in conjunction with the crank shaft of compressors used in the refrigerating industry and will be described as so embodied, but the broad operative principles are applicable to other fields, and no limitation to the particular field of use is implied.

In compressors of the type just mentioned splash lubrication for the pistons is common practice, and the crank case is subject to the suction pressure in the refrigerating system which, at least at certain times, is less than atmospheric pressure. It is important to prevent the inleakage of air into the crank case because such inleakage would lead to the presence of air in the refrigerating circuit, with consequent operating difficulties. For this reason one end bearing for the crank shaft is customarily housed within the crank case but the other end of the shaft must project to a point outside the crank case for connection with the driving motor. This end of the shaft must, therefore, be sealed against the inleakage of air.

Certain of these sealing devices in common use develop an axial thrust on the shaft, and irrespective of this, predominant atmospheric pressure acting on the end of the shaft exposed outside the crank case, develops an inward thrust of substantial amount upon the shaft. Where this thrust is taken up by the bearing enclosed within the crank case, serious lubricating difficulties have been encountered, and the purpose of the present invention is to overcome these difficulties in a simple and practical manner.

A preferred embodiment of the invention will now be described in connection with the accompanying drawing, in which,—

Fig. 1 is a view partly in section and partly in elevation showing a portion of the crank case and crank shaft and illustrating a bearing embodying the present invention.

Fig. 2 is an end elevation of a bearing shell used in the bearing shown in Fig. 1.

Referring first to Fig. 1, 6 represents the crank shaft which has two main journals 7 and 8 and two crank throws with crank pins 9 and 11. The journal 7 is the one which turns in the bearing completely housed within the crank case and is the bearing to which the invention is applied. The journal 8 is the one beyond which the crank shaft extends through a packing device to a point external to the crank case. Since the last-named details are not material to the invention the journal 8 is only partially shown, and the packing device and shaft extension are wholly omitted.

The crank case is indicated generally at 12. The journal 8 turns in a bearing shell 13, which so far as the present invention is concerned, may be of any suitable form. While it terminates in a thrust collar, it will be assumed for the purposes of this case, that that collar is not subject to substantial thrust under ordinary operating conditions, and consequently the shell 13 may be assumed to be of conventional construction. The shell is supported in a portion 14 of the crank case 12, or in any other suitable manner.

The journal 7 is surrounded at its right hand end by a thrust flange 15 formed on the crank shaft 6, and turns in a bearing shell 16 mounted in the portion 17 of the crank case. The portion 17 is of such configuration as to offer a well or reservoir 18 which retains oil against the end of the journal 7. Ordinarily the oil level in the crank case is above the entrance to the chamber 18, but the parts are so arranged that if the oil level fell below such entrance oil splashed by the rotating crank shaft would keep the chamber 18 full of oil. The shell 16 is provided with a boss or key 19 (see also Fig. 2) which retains the shell against rotation, and is also formed with a thrust flange or collar 21 which coacts with the thrust flange 15 on the shaft.

The shell 16 extends into the chamber 18 a substantial distance beyond the exposed end of the journal 7 and this is an important feature because it reduces the turbulence of the oil in the chamber 18. One difficulty encountered in prior constructions was that the rotation of the exposed end of the shaft produced such turbulence in the contacting oil as to impair the feed of oil to the bearing. As a result of the reduction of turbulence by the means just described there is some gravity feed of oil from the chamber 18 through the oil grooves 22 formed in the radial portion of the shell 16. Two such grooves are shown in Fig. 2.

The effect of the extension of shell 16 in reducing turbulence apparently involves certain centrifugal reactions. Extension of the bearing shell beyond the end of journal 7 serves to prevent rotation of the journal from throwing the oil in reservoir 18 away from central oil passage 23 and oil grooves 22, 22. Were bearing shell 16 not extended beyond the end of the journal, the oil would be thrown off the periphery of the journal as it revolves, and thus prevent oil from entering either central passage 23 in the journal or the bearing grooves 22, 22. With the extended bearing arrangement, the tendency of the journal to throw the oil outwardly is counteracted, and thus entry of the oil into grooves 22 and passage 23 is ensured.

Reliance is not placed entirely upon gravity flow through grooves 22, 22. An axial port 23 is drilled through the center of the journal 7, and being open at the end of the shaft, is in direct communication with the oil in the chamber 18. This port 23 communicates with a radial port 24 so contrived that it terminates as a groove port 25 in the face of the thrust flange 15 on the crank shaft. Centrifugal force developed upon oil in the radial port 24 and groove 25 induces flow not only through the center port 23 but also through the ports 22, each of which communicates with the groove port 25 once in every revolution.

While the groove port 25 in the face of thrust flange 15 is useful and desirable in all cases, it is strictly necessary only in small compressors operating at moderate rotary speeds. If the rotary speed be high, or if a thrust collar of relatively large diameter be used (even at moderate rotary speeds) the oil film between flange 15 and collar 21 develops a sufficient centrifugal tendency to ensure feed provided oil be fed to its inner margin. This is particularly true if a radial port such as 24 performs the feeding function, and delivers the oil under centrifugal pressure.

In the broader aspects, the invention contemplates feed of oil to the inner margin of a plain thrust collar and outward feed of oil between the thrust surfaces by centrifugal force.

While it seems surprising that a bearing structure which is normally submerged in oil should suffer for lack of lubrication, it is a fact that the thrust bearing composed of the flange 15 and collar 21 has been a source of lubricating trouble. By combining the centrifugal flow characteristics with means for reducing the turbulence at the end of the bearing, at which the oil is supplied, satisfactory lubrication has been secured. In this way the use of plain radial thrust bearings is made possible with a very simple lubricating system, and the use of complicated ball or collar thrust bearings, heretofore commonly considered indispensable at this point, has been avoided.

What is claimed is,—

1. The combination of means for supporting a bearing and providing an oil reservoir at one end thereof; a bearing supported thereby, open at one end to said reservoir, having at the other end a thrust collar, and having an oil groove leading from the reservoir to the collar; and a journal turning in said bearing and having a thrust flange coacting with said collar, said flange having a radial groove which communicates with the oil groove as the journal revolves, and the journal having an oil passage leading from said reservoir to said radial groove for delivering oil under centrifugal pressure to the radial groove.

2. The combination of means for supporting a bearing and providing an oil reservoir at one end thereof; a substantially horizontal, plain bearing supported thereby, open at one end to said reservoir, and having at the other end a thrust collar; and a substantially horizontal journal turning in said bearing and having a thrust flange coacting with said collar, said flange having a radial groove and the journal having an oil passage extending through said journal and connecting said reservoir and said radial groove for delivering oil under centrifugal pressure to the radial groove.

3. The combination of means for supporting a bearing and providing an oil reservoir at one end thereof; a bearing supported thereby, open at one end to said reservoir, having at the other end a thrust collar, and having an oil groove leading from the reservoir to the collar; and a journal turning in said bearing and having a thrust flange coacting with said collar, said flange having a radial groove which communicates with the oil groove as the journal revolves and the journal having an oil passage leading from said reservoir substantially along the axis of said journal and then substantially radially to said radial groove for delivering oil under centrifugal pressure to the radial groove.

4. The combination of a rotary journal having a thrust flange; a bearing therefor having a radial portion in which said journal turns, and a thrust portion co-acting with said flange, said radial portion having at least one oil groove terminating adjacent said thrust portion; means for supplying oil to said groove; means for drawing such oil through said groove comprising a radial groove in said flange arranged to communicate with the first-named groove as the journal turns; and means in the journal for conveying oil to the second-named groove from the reservoir and independently of the first-named groove.

5. The combination of means for supporting a bearing and providing an oil reservoir at one end thereof; a bearing supported thereby, open at one end to said reservoir, having at the other end a thrust collar, and having an oil groove leading from the reservoir to the collar; and a journal turning in said bearing and having a thrust flange coacting with said collar, said flange having a radial groove which communicates with the oil groove as the journal revolves, the bearing being substantially longer than the journal and serving to preserve in the reservoir adjacent the end of the journal a body of relatively quiescent oil.

6. The combination of a rotary journal; a radial bearing therefor, said journal and said bearing having annular opposed thrust bearing surfaces and the radial portion of the bearing being provided with at least one oil groove; oil feeding means comprising an oil passage extending through said journal; and oil supply means, said groove and said passage leading from the supply means to the inner margin of said thrust bearing surface on the journal, so that said passage delivers oil under centrifugal force to the space between said thrust bearing surfaces and thus induces flow of oil through said oil groove.

7. The combination of means for supporting a bearing and providing an oil reservoir at one end thereof; a bearing supported thereby, open at one end to said reservoir, having at the other end a thrust collar, and having an oil groove leading from the reservoir to the collar; and a journal turning in said bearing and having a thrust flange coacting with said collar, said flange having a radial groove which communicates with the oil groove as the journal revolves, and the journal having an oil passage leading from said reservoir to said radial groove for delivering oil under centrifugal pressure to the radial groove, the bearing being substantially longer than the journal and serving to preserve in the reservoir adjacent the end of the journal a body of relatively quiescent oil.

8. The combination of means for supporting a bearing and providing an oil reservoir at one end thereof; a substantially horizontal, plain bearing supported thereby, open at one end to said reservoir, and having at the other end a thrust collar; and a substantially horizontal journal turning in said bearing and having a thrust flange coacting with said collar, said flange having a radial groove and the journal having an oil passage extending through said journal and connecting said reservoir and said radial groove for delivering oil under centrifugal pressure to the radial groove, the bearing being substantially longer than the journal and serving to preserve in the reservoir adjacent the end of the journal a body of relatively quiescent oil.

9. The combination of means for supporting a substantially horizontal bearing part and providing an oil reservoir at one end thereof; a substantially horizontal bearing part supported thereby, said bearing part being open at one end to the reservoir and having a thrust collar at the other end; and a substantially horizontal journal part turning in said bearing part and having a thrust flange coacting with said collar, the bearing part having an extension projecting into the reservoir substantially beyond the end of the journal part to preserve in the reservoir adjacent the end of the journal part a body of relatively quiescent oil, one of said parts having oil feeding means leading from said reservoir at a point within said extension to the inner margin of said thrust collar.

FRENCH E. DENNISON.
WILLIAM D. LEONARD.